April 17, 1951   C. A. VOSSBERG, JR   2,549,402
X-RAY MEASURING SYSTEM

Filed April 1, 1948                                   3 Sheets-Sheet 1

Inventor
CARL A. VOSSBERG JR.

By J. Stephen Baker
Attorney

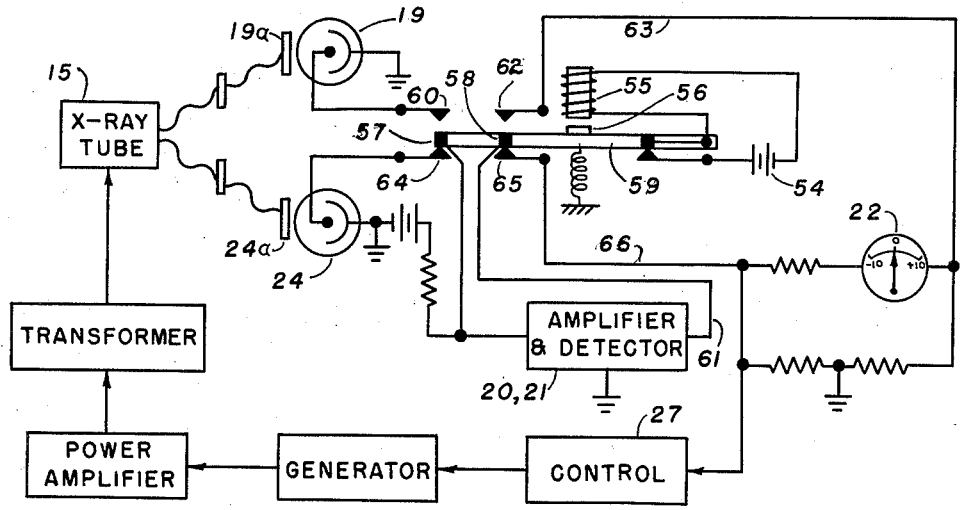
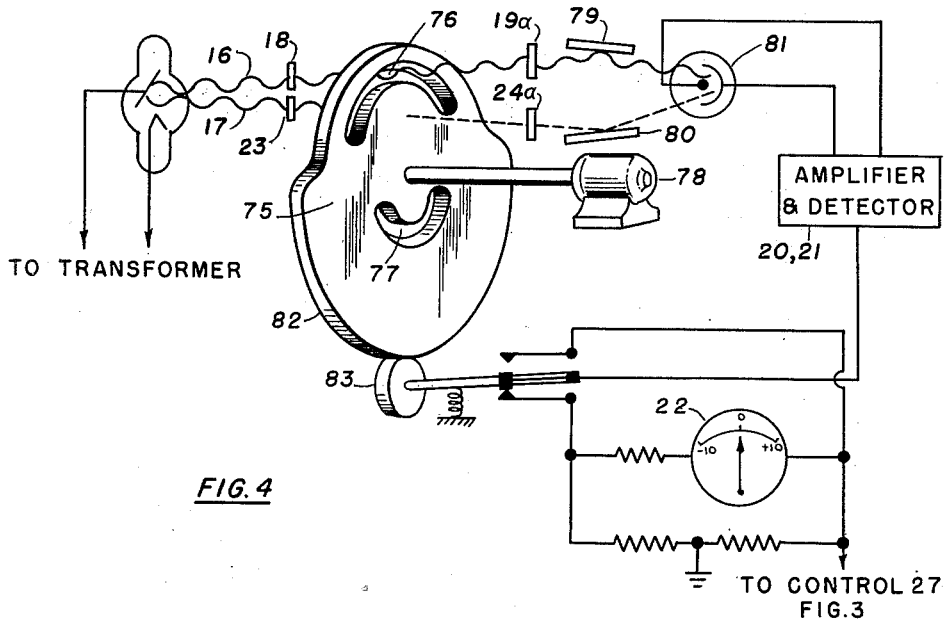

April 17, 1951  C. A. VOSSBERG, JR  2,549,402
X-RAY MEASURING SYSTEM
Filed April 1, 1948  3 Sheets-Sheet 3

Inventor
CARL A. VOSSBERG JR.

By S. Stephen Baker
Attorney

Patented Apr. 17, 1951

2,549,402

UNITED STATES PATENT OFFICE 2,549,402

X-RAY MEASURING SYSTEM

Carl A. Vossberg, Jr., Lynbrook, N. Y.

Application April 1, 1948, Serial No. 18,469

1 Claim. (Cl. 250—83.6)

This invention relates to measuring systems and more particularly to an apparatus for measuring the thickness, density, homogeneity and related characteristics of materials. The measurement is effected continuously and without requiring contact with the material.

In apparatus of this type, aging of components and changes in operating voltages ordinarily create instability which produces errors or inaccuracies in the final result. Many other variables contribute to such inaccuracies. According to the present system, means are provided to automatically compensate for deviations from normal operating conditions so that the defects normally inherent in any such system are minimized. It is a further and most important object of this invention to include measurement indicating means which disclose the deviation in characteristics of the material being measured from those of a reference standard and wherein the indicia of the meter is applicable notwithstanding changes in the reference standard and the fact that such deviations are set forth in terms of percentage. Thus, if a strip of ⅛″ steel is the reference standard, the indicating means will disclose a deviation of a specimen being measured for thickness in terms of percentage, and that same percentage will be indicated in the event of a corresponding deviation of another specimen from a ½″ reference standard. The user may therefore insert any reasonable reference standard in the place provided therefor and the indicating means will accurately disclose the deviation therefrom of the material being measured. This is accomplished by providing a control channel which produces a control signal of a value related to the particular reference standard. This control signal is then caused to react upon a radiation generator the rays of which are applied directly to the material so as to measure its characteristics. The resulting signal is measured on a meter. If the reference standard itself deviates from an arbitrary thickness or other characteristic as above mentioned, the control signal will automatically increase or decrease the output of the radiation generator accordingly so that the meter indicia is applicable to the changed conditions. Various circuits are disclosed herein for accomplishing the above efficiently and in conformity with various requirements. Accordingly, it is intended that the above statement of the objects of my invention be considered as descriptive of the general application of the invention and not as a limitation thereon.

Referring to the drawings:

Fig. 3 is a first modified embodiment of the apparatus.

Figs. 4, 5 and 6 are further modifications.

Figure 1:
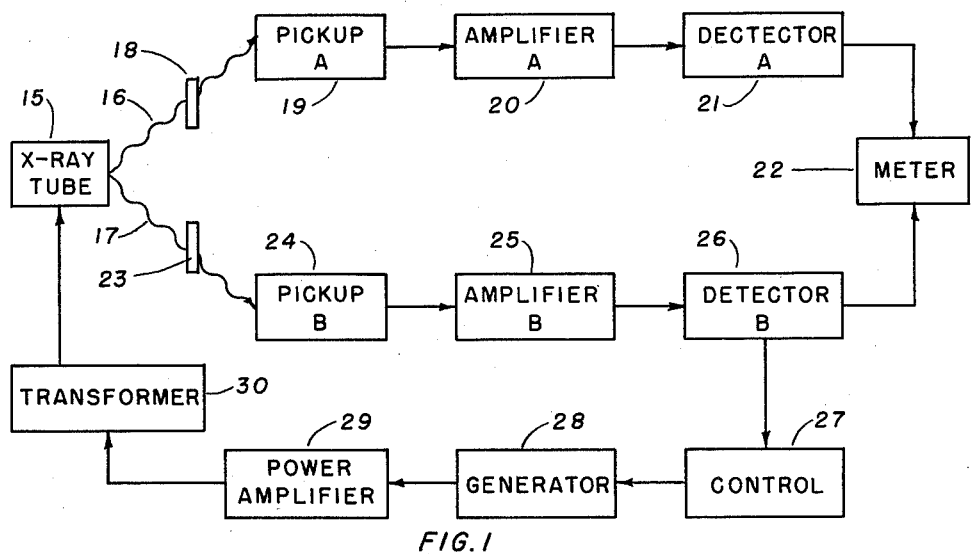
Fig. 1 is a block diagram of a system constructed according to the instant invention.

Referring to Fig. 1, the radiation generator 15 is disclosed as an X-ray tube although it may represent any generator of the particular radiation that is required. For example, if translucency of material is to be measured, generator 15 may be an ordinary filament lamp. Upon suitable excitation, as will be hereinafter described, tube 15 emits rays or beams 16 and 17 which are in reality a single beam but which may be considered as being separate beams for the purposes set forth. Ray 16 passes through the material 18 of which the thickness or other property is to be measured. When the beam emerges therethrough, it is measured by pick-up 19 which is responsive to the particular type of radiation employed. In the described apparatus it takes the form of a fluorescent screen and a photocell as will be hereinafter described. The output of pick-up 19 is in the form of an electrical voltage which is applied to amplifier 20. After amplification, the voltage is rectified in detector 21 and fed to a meter 22. Pick-up 19, amplifier 20 and detector 21 are referred to herein as the A channel, this channel serving the material being measured. Material 18 may be a continuously moving bar or sheet of steel, or the like, which passes between the X-ray tube and pick-up 19. As such, it may be measured notwithstanding its heat conditions or deformability under pressure. The transmitted wave impinging on pick-up 19 is a function of the emitted wave 16 and the material 18. If the characteristics of wave 16 are constant, the excitation to pick-up 19 is only a function of the character of material 18. Further, if 18 is a particular material, the result in excitation is a function of its thickness. Thus, the meter 22 will indicate the variations in the characteristics of material 18 providing the wave 16 is constant. Channel A, from pick-up 19 to meter 22 is therefore the signal channel representing the variations in material 18.

Channel B serves to provide the correct comparison voltages as derived through the measurements of a reference standard 23. It further serves, however, to maintain constant X-ray output regardless of voltage changes, ageing of components and constant excitation to pickups 24 in spite of variations in the thickness of different reference standards. That portion of the X-ray beam designated as 17 is passed through the reference standard material 23 so as to excite a pick-up 24 which is of the same character as pick-up 19. Amplifier 25 and detector 26 serve the same purpose as their counter-parts in channel A. Detector 26 being likewise applied to meter 22, the difference between the signal outputs of the two channels is measured. If the signals were balanced, i. e. of the same magnitude, X-ray variations would affect both channels in the same manner and the output would still remain in balance. Accordingly, one of the channels, i. e. channel B, is used to effect compensations in regard to varying conditions of operation.

Assuming that the meter scale of meter 22 is calibrated plus and minus 10% about the midpoint, the meter may be used to indicate such percentage deviations from the reference standard. The gain of the system may be set so that a 10% increase in thickness of material 18 relative to the reference material 23 will cause the meter 22 to deflect to an indication of plus 10% pursuant to a particular beam intensity of ray 16 resulting in an attenuated ray of specifically lessened intensity impinging on pick-up 19. The gain of the system may be set, according to known standards, either by adjusting the X-ray voltage or the gain of pick-up 19 or amplifier 20.

If a material of different thickness is substituted for material 18, and the X-rays from tube 15 adjusted until the output of pickup 19 becomes the same as before, i. e. prior to the 10% increment, and the meter again balanced or returned to zero indication, then a 10% increase of this second material will cause the meter to deflect as before. Therefore, one calibrated meter will suffice for a wide range of thickness measurements by the expedient of maintaining the required signal excitation for the nominal or arbitrary thickness.

Channel B is employed to produce the same nominal intensity of X-ray beam after passing through the specimen being measured. If reference material 23 is selected to be of the thickness or other characteristic corresponding to zero on the meter 22 and the X-ray tube output adjusted to provide a signal of an intensity producing the correct reading on the meter for different thickness of material 18 about the nominal thickness of material 23, then by substituting a new and different thickness of material 23, and readjusting the X-ray output to provide the same signal as before in channel B, the result will provide the correct setting of the system so as to permit the meter to properly indicate the deviation of other tested material at 18 from the new reference standard.

For example, let us assume a sheet of .050" steel is used as the reference standard 23. The X-ray output from tube 15 is adjusted so that when samples of .045", .050" and .055" steel are placed at 18, the meter deflections are indicated as minus 10%, 0% and plus 10% respectively. The meter itself may be particularly calibrated to accomplish this result. A different specimen such as .020" steel may thereafter be substituted for standard 23 and the X-ray output may then be re-adjusted to produce the same signal in channel B. The particular setting of the system will then be correct so that the meter 22 will read minus 10% when .018" steel is placed at 18.

This result will hold true for any material which will attenuate the radiation.

The instant invention provides means for automatically accomplishing the signal output adjustment in accordance with the particular reference standard employed. Referring to Fig. 1, the output of detector 26 is passed to a control stage 27 which adjusts the signal output of generator 28 inversely to the signal from detector 26. This is then amplified by power amplifier 29 the output of which is applied to the X-ray tube through transformer 30. If the output of detector 26 is different from a predetermined value, an error signal is applied to the control 27 which then corrects the generator output to the correct value for the required detector output.

It will be recognized that a satisfactory method of adjusting the system is to insert a reference standard at position 23 and a specimen of known deviation at position 18 whereupon the gain of amplifier 20 may be adjusted to correspond to the meter calibration.

When the standard 23 is changed, channel B will effect a correction of the voltage applied to the X-ray tube so that the output impinging on pick-up 24 will be constant, i. e., the correct value for proper meter calibration.

It will be seen from the foregoing that if it is desired that the meter properly indicate deviations from, for example, .050" brass during a certain predetermined time interval, such a specimen is placed at 23 for that particular operation and the system will then be automatically correctly set so that the meter will read 0% when .050" brass is placed at 18 and the indications will follow changes or deviations therefrom.

Figure 2:
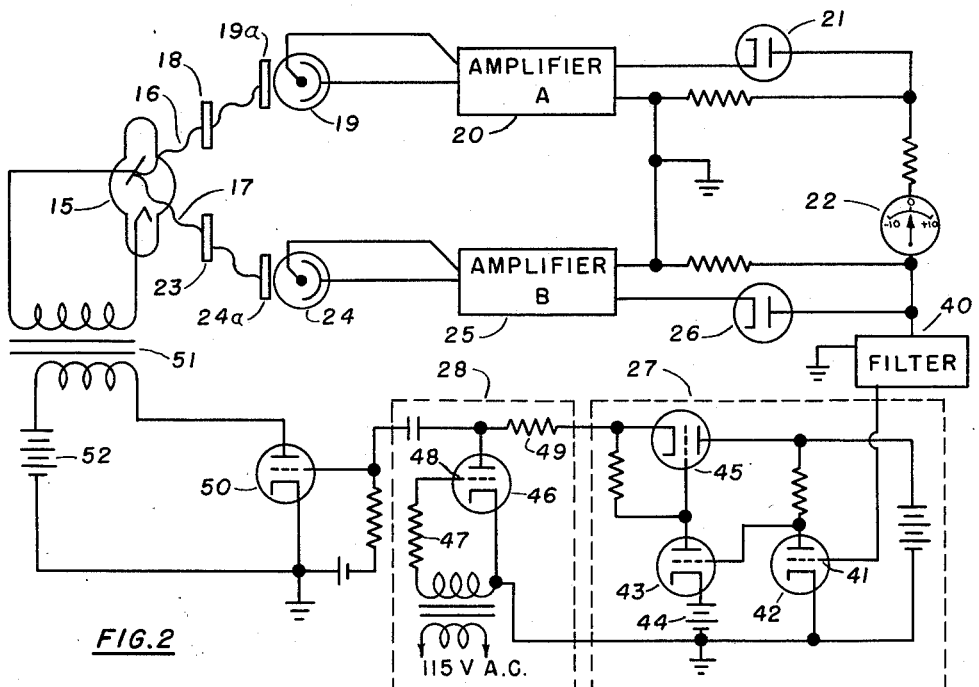
Fig. 2 is a schematic circuit diagram disclosing in further detail several of the blocks of Fig. 1.

In the schematic of Fig. 2, the components correspond to the blocks of Fig. 1 with the power supply added as separate batteries or voltage sources. Tube 15 emits a beam of X-rays which pass through materials 18 and 23 to fluorescent screens 19a and 24a respectively. The resultant scintillation excites phototubes 19 and 24 and electrical signals are produced which are respectively amplified by amplifiers 20 and 25 which are of conventional form in the instant embodiment.

The amplified signals are then detected in a conventional rectifier circuit as by the diode tubes 21 and 26. The difference between the rectified signals is measured by meter 22 as hereinabove described.

The rectified signal of channel B is further utilized after passing through a conventional A. C. ripple filter 40. The direct current signal, varying if the signal in channel B changes, is applied to the grid 41 of tube 42. Tube 42 is a direct coupled amplifier as is tube 43. However, for more effective control, tube 43 is biased by voltage source 44 so that the signal output of tube 42 must be of the same order of voltage 44 before a signal is transferred to the grid-cathode of tube 45. Tube 45 controls the voltage applied to tube 46.

The immediately foregoing elements function as follows:

Assuming that the signal in channel B increases, the grid 41 of tube 42 becomes more negative, increasing the plate voltage of the tube or the grid potential of tube 43. If this is sufficient to overcome the bias set by voltage 44, the plate current of tube 43 will increase which in turn puts the grid of tube 45 at a more negative potential, thus increasing the plate cathode drop in tube 45. As a result, the plate supply voltage of tube 46 decreases.

Tube 46 and its associated circuit takes the form of a generator or amplifier the output of which is controlled by the voltage on one of its elements. A modulated oscillator or amplifier will serve the same purpose. Several such examples are described in Terman's "Radio Engineer's Handbook" (McGraw-Hill Co., first ed., pp. 533 et seq.). A limited saturated amplifier is shown in Fig. 2. A high voltage signal is impressed through limiting resistor 47 on grid 48 of tube 46. This voltage may be derived from the alternating current power lines as shown or from a separate generator. If the plate load resistance 49 and that of tube 45 are reasonably high, the signal output of tube 46 is practically its plate supply voltage since tube 46 is driven from plate current cut-off to saturation. Therefore, if the plate supply voltage is varied, as above described, the signal output likewise varies. Tube 50 is a power amplifier the output of which is coupled to the X-ray tube 15 by transformer 51. Accordingly, the voltage impressed on the X-ray tube through the power supply 52 is varied according to the effective conductivity or impedance of tube 50.

Summarizing the foregoing operation, the X-ray output is a function of the plate voltage on the signal generator tube 46 which is controlled by circuit 27, the controlling signal being derived from the detected output of channel B. If voltage 44 is maintained constant either through the use of a battery or voltage regulator, and the gain of the system made very high, the control will take effect when sufficient signal is applied to the grip of tube 43 to overcome the bias due to voltage 44. Accordingly, any factor tending to change the signal in channel B such as a change of reference standard 23, supply voltages, or gain of the system, will be offset by a change in the energizing voltage applied to the X-ray tube to specifically correct for this disturbance by varying the output of the X-ray tube inversely.

For economy of power, generator 46 may be a pulse generator so that the X-ray tube 15 will emit during relatively short periods. The choice of frequency is not critical but will depend upon the particular measurement problem and associated practical considerations as will be understood by those skilled in the art. It is also evident that photocells 19 and 24 may take the form of photo-multiplier tubes, the action being identical save for the amplifying characteristics of such tubes.

Amplifier 20 and detector 21 of channel A are outside of the control loop above described. However, this is of minor importance since it is well known in the art how an amplifier can be maintained stable.

The foregoing describes independent channels for the rays 16 and 17, but a single or common system may be employed. For example, Fig. 3 illustrates the use of a vibrator which alternately switches the signals from pickups 19 and 24 to a common amplifier and detector. Thus, voltage 54 energizes coil 55 so as to attract armature 56 periodically pursuant to the well known action of a vibrator. Contacts 57 and 58 are supported on the insulating armature 59 so that these contacts vibrate or sweep together with the armature. The output of photocell 19 is applied through contacts 60 and 57 to the amplifier and detector 20, 21. At the same time, the output of the amplifier and detector is applied through wire 61, contact 58, contact 62 and wire 63 to meter 22. At the return vibration, contact 57 takes the output of photocell 24 from contact 64 and applies it to the amplifier and detector. Wire 61 then transfers the output through contact 58, contact 65 and wire 66 to the meter 22. If the switching frequency is sufficiently high or the meter suitably damped, the meter will indicate the difference in the average rectified amplitudes of the signals from photocells 19 and 24. Only the reference signal from photocell 24 is passed on to the control 27. The switching is shown as being effected by the sweeping contacts of a mechanical vibrator, but it may be accomplished electronically by any of several well known systems such as described in "Ultra-High Frequency Techniques" by Brainerd (D. Van Nostrand Co., Inc., 13th printing, pp. 226–227).

A modification of the switching method, described hereinafter, is to alternately scan either the X-rays emanating from tube 15 along the two beams described or the light output from fluorescent screens 19a and 24a. In order to avoid synchronizing the switching action with the X-ray pulses if the two frequencies are not widely different, the high voltage to the X-ray tube may be rectified and filtered in a conventional manner into direct current.

Fig. 4 discloses a scanning system which includes many of the components already described. The X-ray beams 16 and 17 pass through specimens 18 and 23 and only one at any one time is transmitted to the measuring system.

The scanner 75 is opaque to X-rays as by being constructed of lead or the like and is formed with two arcuate slots 76 and 77 at unequal radial distances from the center the slots being also circumferentially spaced. Scanner 75 is rotated by motor 78. The radial distances of the slots are such as to permit the beams to alternately pass through the scanner in continuous sequence, the upper beam passing through slot 76 and the lower beam passing through slot 77. The beams emerging from the slots strike respective fluorescent screens 19a and 24a and the resulting light is reflected as by mirrors 79 and 80 respectively to a common photocell 81.

The scanner 75 may also be employed to control the switching of the common channel output to the meter and to control stage 27. Accordingly, the scanner is formed with a peripheral enlargement 82 serving as a cam so that cam roller 83 is depressed during each half revolution of the scanner. This separates the application of the respective photocell signals to the amplifier and detector and to the meter in the same manner as the vibrator of Fig. 3. Thus, only the reference signal passes to control stage 27. The remaining components of the regulating system duplicate those of Figs. 1 and 2. It should be further observed that for the methods disclosed in Figs. 3 and 4, the gain of the amplifier may be controlled instead of the X-ray voltage. This is accomplished by employing the D. C. error signal from control 27 to adjust the bias of variable-mu tubes in the common amplifier and detector. It will also be apparent that such error signal, instead of adjusting the X-ray voltage may adjust the dynodes voltage of a photo multiplier tube used in place of photocells 19 and 24. It will be understood that the gain of a photo multiplier tube can be thereby easily controlled.

As the thickness of material 18 varies, the penetrated X-rays impinging on photocell 19 do not vary proportionately but approximate a logarithmic function. For some purposes it may be desired to employ a meter scale calibrated linearly. Accordingly, non-linearity must be introduced in the system. This may be accomplished by using a non-linear stage of amplification in the amplifier to offset the undesired characteristic. A conventional signal expander or compressor may be used, one form of which is illustrated in connection with Fig. 5.

Figure 5:
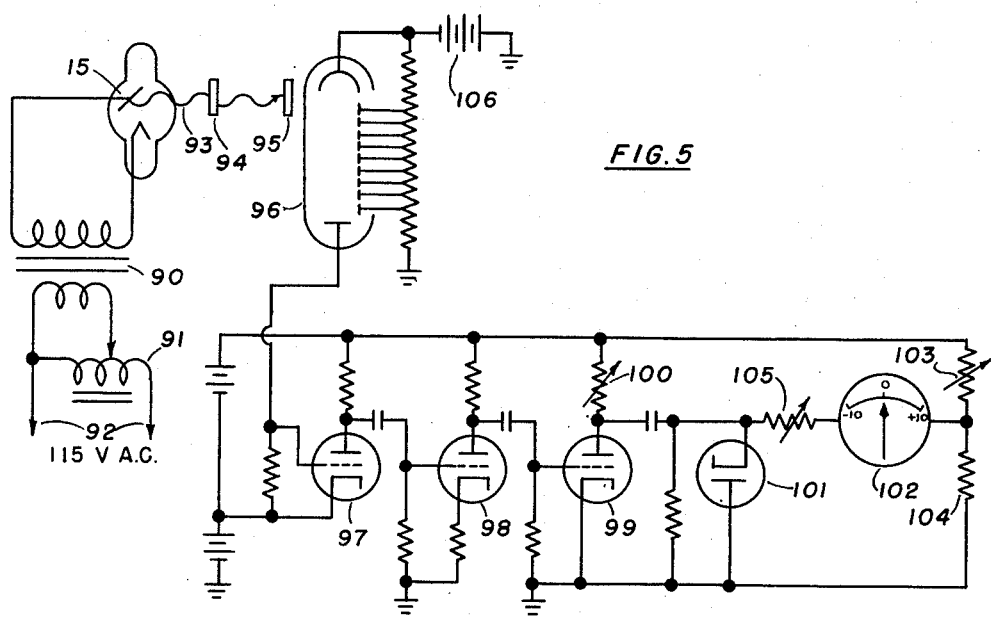

Fig. 5 further illustrates a system where the principle described previously is performed through more or less manual means instead of employing the automatic control. While extreme stability under all conditions may be sacrificed to a slight degree, certain applications may warrant such sacrifice, a particular advantage being the simplification of the apparatus. The basic principle, however, is still utilized, namely, if the meter calibration is correct for one thickness when expressed in percentage deviations, it will also be correct for a different nominal thickness provided the signal being amplified and detected is made the same as before at zero deviation.

As in connection with the constructions shown in Figs. 1 and 2, for example, the signal of the sample measuring circuit of Fig. 5 is applied to a calibrated meter in bucking relation to a signal or voltage that is kept constant regardless of changes in voltages of the X-ray tube supply and regardless of changes in thickness of the sample sheet being measured. As a result, if the gain of the sample measuring circuit is adjusted, for example to correspond to the meter scale calibration to correctly show minus 10 per cent, zero, and plus 10 per cent with samples of .045", .05" and .055" of steel, respectively, and then the sample is replaced by a specimen of .02" steel or other material and the voltage of the X-ray tube is then adjusted until the meter shows zero, there will be the same signal as before in the specimen measuring circuit to the meter. Thus the same effective amount of X-rays will reach the measuring circuit pick-up and as a consequence the calibration of the meter will still be correct for this thicker sheet.

In Fig. 5 which is a schematic of such a system, the X-ray tube 15 is supplied with high voltage from transformer 90, the primary of which is connected to an adjustable autotransformer 91. The usual A. C. lines 92 can supply the power.

The X-ray beam 93 passes the material 94 under examination and the attenuated rays fall on fluorescent screen 95. The light excites the light-sensitive cathode of photo-multiplier tube 96. The weak signal is amplified by means of secondary emission from the several dynodes of the photo-multiplier tube and then passed on for further amplification. Two stages of amplification, tubes 97 and 98 are illustrated. Because of the absorption character of X-rays, the signal does not vary linearly for equal increments in thickness of material. Since in some cases it may be desirable to provide a linear calibration on the meter, correction must be made. The stage comprising the tube 99 and output load and resistance 100 is such a corrective device. It operates on the principle that most thermionic vacuum tubes exhibit non-linear characteristics for different signal excitations. This can be exaggerated by having low plate load impedance, for example, 200,000 ohms, and high signal level which almost drives the tube to cut-off. Both are used in this example so that the output increments are essentially linear with respect to equal percentage increments of material thickness. Therefore, tube 99 acts as a signal compressor. For other applications, the opposite characteristic be desired in which case a signal expander may be employed.

The signal is detected by rectifier 101 and the rectified signal read on current meter 102. The meter 102, duplicating meter 22, is connected to a positive potential determined by resistors 103 and 104 in order to set the proper operating point. In one application, for example, resistor 103 is adjusted so that the meter 102 reads off-scale in its normal position when no X-rays are applied to the system. Then when X-rays are applied, the meter will come on-scale. If specimen 94 becomes thinner, the signal will become greater and the meter will read more negative. The meter sensitivity is controlled by resistor 105.

In practice, the X-ray tube is adjusted manually by means of autotransformer 91 to achieve the proper signal in the amplifier for which the meter calibration is correct. Each time a new standard is employed, the autotransformer is manually adjusted and the new standard need not be further employed. The specimen 94 is then disposed in place of the standard. It will be further noted that the photo multiplier dynode voltage 106 may be varied manually as by having a rheostat in series therewith so as to adjust the gain of the tube instead of varying the X-ray supply voltage. The effect of doing so is obviously the same as said supply voltage variation.

Figure 6:
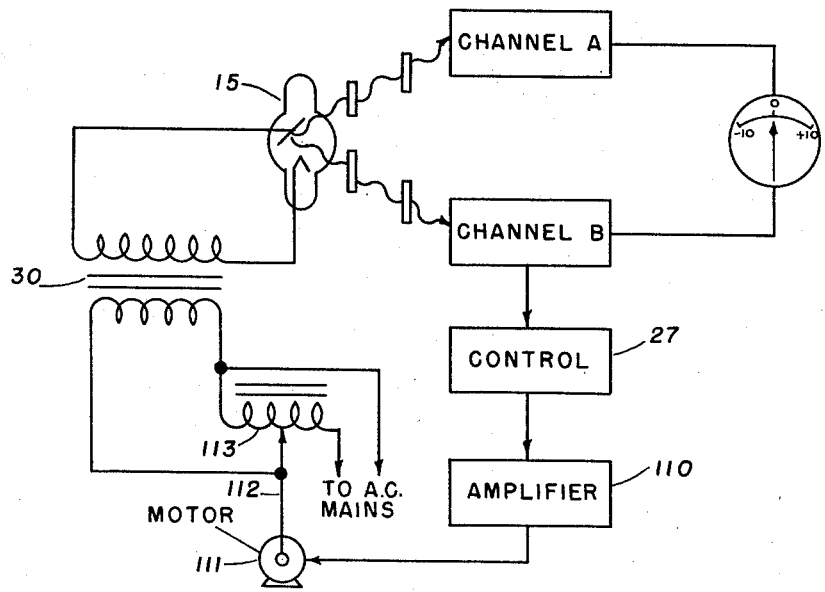

In Fig. 6 is illustrated a control system duplicating the first described system except that it is of electromechanical form. Thus, control 27 feeds a conventional amplifier 110 which drives motor 111. Motor 111 actuates an arm 112 comprising the movable arm of an autotransformer 113. The input of the transformer is connected to the A. C. lines while the output is connected to the X-ray tube transformer 30. Operation of the motor follows any well known servo-mechanism system as is conventional. Further explanations of such a system are found in "Servo-mechanism Fundamentals" by Lauer, Lesnick and Matson, McGraw-Hill Book Co. (1947), p. 266.

It will be noted that in most of the foregoing systems in actual practice, the specimens 13 and 23 may be the same strip of steel after and before passing through reducing rollers so that the effect of the rollers is thereby measured.

The foregoing systems provide either manual or automatic adjustment of a source of radiation so that upon penetration of a specific material, the penetrating radiation will be of a predetermined value thus producing a similar change in penetrating radiation for a corresponding change, in percentage, of the material regardless of its character. The adjustment is effected with relation to the indicia of the meter and varies with each different reference specimen so that the radiation, after penetration is always equal to a predetermined value. Accordingly, the meter need only be set once and its indicia will be applicable for any reference specimen. It will be observed that the output of the source of radiation is diminished or interrupted substantially solely by the specimen under examination between the generator and the pick-up. Substantially no other variables contribute to such radiation diminishing effect so that it is possible to regulate or adjust the source of radiation precisely by the character of the specimen under examination. As such, the system permits speedy and accurate measurements and is capable of effecting considerable economies in the production of thin, continuous components.

While there has been described what at present is considered a preferred embodiment of the invention, it will be evident that many changes and modifications may be made therein without departing from its spirit. It is therefore aimed in the appended claim to cover all such changes and modifications which fall within the true spirit and scope of the invention.

What is claimed is:

A method of measuring a test specimen's thickness characteristic or the like which comprises generating a quantity of radiation adapted to penetrate the specimen and directing it through a standard reference specimen so as to derive a quantity of penetrated radiation therefrom, picking up the penetrated radiation and transforming it into an electrical voltage, measuring said voltage on a meter calibrated in terms of percentage on both sides of a zero or reference point, regulating the quantity of radiation generated until the meter reads at said reference point, directing the regulated quantity of radiation through the test specimen so as to derive a quantity of generated radiation therefrom and thereafter measuring the voltage derived therefrom on said meter so as to determine its deviation from said zero or reference point in terms of percentage.

CARL A. VOSSBERG, Jr.

REFERENCES CITED

The following references are of record in the file of this patent:

UNITED STATES PATENTS

| Number | Name | Date |
|---|---|---|
| 2,227,353 | Kuntke | Dec. 31, 1940 |
| 2,467,812 | Clapp | Apr. 19, 1949 |
| 2,503,075 | Smith | Apr. 4, 1950 |

OTHER REFERENCES

Smith–General Elec. Review, Mar. 1945, pp. 13–17.

Clapp and Pohl: Electrical Engineering, May 1948, vol. 67, pp. 441–444.